US012806571B2

(12) United States Patent
Altaee et al.

(10) Patent No.: US 12,806,571 B2
(45) Date of Patent: Nov. 24, 2026

(54) METHOD, APPARATUS AND SYSTEM FOR SEAWATER TREATMENT

(71) Applicants: Qatar Foundation for Education, Science and Community Development, Doha (QA); Qatar University, Doha (QA)

(72) Inventors: Ali Altaee, Doha (QA); Daoud Khanafer, Doha (QA); Alaa H. Hawari, Doha (QA)

(73) Assignees: Qatar Foundation for Education, Science and Community Development, Doha (QA); Qatar University, Doha (QA)

( * ) Notice: Subject to any disclaimer, the term of this patent is extended or adjusted under 35 U.S.C. 154(b) by 358 days.

(21) Appl. No.: 18/294,421

(22) PCT Filed: Sep. 7, 2022

(86) PCT No.: PCT/QA2022/050017
§ 371 (c)(1),
(2) Date: Feb. 1, 2024

(87) PCT Pub. No.: WO2023/038538
PCT Pub. Date: Mar. 16, 2023

(65) Prior Publication Data

US 2025/0091005 A1 Mar. 20, 2025

Related U.S. Application Data

(60) Provisional application No. 63/242,097, filed on Sep. 9, 2021.

(51) Int. Cl.
*B01D 61/02* (2006.01)
*B01D 3/06* (2006.01)
*B01D 61/00* (2006.01)

(52) U.S. Cl.
CPC ............ *B01D 61/027* (2013.01); *B01D 3/06* (2013.01); *B01D 61/002* (2013.01); *B01D 2311/2669* (2013.01)

(58) Field of Classification Search
CPC ...... B01D 61/027; B01D 3/06; B01D 61/002; B01D 2311/2669; B01D 3/065;
(Continued)

(56) References Cited

U.S. PATENT DOCUMENTS

| | | | | |
|---|---|---|---|---|
| 9,662,615 B2 * | 5/2017 | Roy | ..................... | B01D 69/125 |
| 2013/0105383 A1 * | 5/2013 | Tang | .................... | B01D 69/107 427/244 |
| 2013/0213881 A1 | 8/2013 | Diallo | | |

FOREIGN PATENT DOCUMENTS

| | | | |
|---|---|---|---|
| WO | 2014014669 A1 | 1/2014 | |
| WO | 2016160810 A1 | 10/2016 | |
| WO | WO-2020049579 A1 * | 3/2020 | ............. B01D 61/58 |

OTHER PUBLICATIONS

International Search Report for related International Application No. PCT/QA2022/050017; action dated Mar. 16, 2023; (2 pages).

(Continued)

*Primary Examiner* — Ekandra S. Miller-Cruz
(74) *Attorney, Agent, or Firm* — K&L Gates LLP

(57) ABSTRACT

A method, apparatus and system for seawater treatment are provided. The apparatus for seawater treatment includes a first chamber that is in fluid communication with a feed solution, a second chamber that is in fluid communication with a draw solution, and a membrane that separates the first chamber from the second chamber. The membrane has an active layer and a support layer provided on the active layer, and the membrane includes a nanofiltration membrane.

20 Claims, 3 Drawing Sheets

(58) Field of Classification Search
CPC . B01D 3/145; C02F 1/06; C02F 1/445; C02F 2103/08; Y02A 20/131
USPC .......................................................... 210/650
See application file for complete search history.

(56) References Cited

OTHER PUBLICATIONS

Written Opinion for related International Application No. PCT/QA2022/050017; action dated Mar. 16, 2023; (5 pages).
Thabit; "Evaluation of Forward Osmosis as a Pretreatment Process for Multi Stage Flash Seawater Desalination"; Jul. 1, 2019; ScienceDirect; vol. 461; (6 pages).
Siew; "Nanofiltration of Simulated Acid Mine Drainage: Effect of pH and Membrane Charge"; Applied Sciences; Jan. 2020; ResearchGate; (21 pages).

* cited by examiner

METHOD, APPARATUS AND SYSTEM FOR SEAWATER TREATMENT

CROSS REFERENCE TO RELATED APPLICATION

The present application is a National Stage filing under 35 U.S.C. 371 of International Application No. PCT/QA2022/050017, filed Sep. 7, 2022, which claims priority to U.S. Provisional Patent Application No. 63/242,097, filed Sep. 9, 2021, the disclosure of which is incorporated into this specification by reference in its entirety.

BACKGROUND

Scale formation in the thermal desalination processes is a major drawback that affects the performance of thermal desalination plants. Non-alkaline scale is one of the major scales in thermal desalination processes. The non-alkaline scale is often formed in thermal plants operating at high temperatures such as in Multi-Stage Flash Distillation ("MSF") process. The non-alkaline scale is caused due to the precipitation of calcium ($Ca^{2+}$) or magnesium ($Mg^{2+}$) ions with sulfate ($SO_4^{2-}$) as calcium sulfate ($CaSO_4$) or magnesium sulfate ($MgSO_4$) salts. The non-alkaline scale is not responsive to acid cleaning, and thus requires more complicated and labor intensive mechanical cleaning processes. Moreover, the scale problem may increase the energy requirements and the maintenance cost of the thermal desalination process. Thus, there are needs to minimize the scale problem and further reduce the energy consumption and maintenance cost of the thermal desalination process.

SUMMARY

The present disclosure generally relates to a method, apparatus and system for seawater treatment. In particular, the present disclosure is directed to a method, apparatus and system for seawater softening with a nanofiltration membrane in the forward osmosis ("FO") process.

In light of the present disclosure, and without limiting the scope of the disclosure in any way, in an aspect of the present disclosure, which may be combined with any other aspect listed herein unless specified otherwise, an apparatus for seawater treatment is provided. The apparatus includes a first chamber that is in fluid communication with a feed solution, a second chamber that is in fluid communication with a draw solution, and a membrane that separates the first chamber from the second chamber. The membrane has an active layer and a support layer provided on the active layer, and the membrane includes a nanofiltration membrane.

In an aspect of the present disclosure, which may be combined with any other aspect listed herein unless specified otherwise, the membrane has a molecular weight cut-off value larger than 300 Dalton.

In an aspect of the present disclosure, which may be combined with any other aspect listed herein unless specified otherwise, the membrane has a rejection rate to magnesium sulfate of 98.5% or more.

In an aspect of the present disclosure, which may be combined with any other aspect listed herein unless specified otherwise, the support layer has a thickness of 200 μm or less.

In an aspect of the present disclosure, which may be combined with any other aspect listed herein unless specified otherwise, the active layer of the membrane faces the feed solution and the support layer of the membrane faces the draw solution.

In an aspect of the present disclosure, which may be combined with any other aspect listed herein unless specified otherwise, the feed solution includes seawater.

In an aspect of the present disclosure, which may be combined with any other aspect listed herein unless specified otherwise, the draw solution includes brine reject.

In an aspect of the present disclosure, which may be combined with any other aspect listed herein unless specified otherwise, the draw solution has higher concentration of salt than the feed solution.

In an aspect of the present disclosure, which may be combined with any other aspect listed herein unless specified otherwise, the apparatus further comprising a pressure pump, and the pressure pump is configured to apply a hydraulic pressure on feed solution.

In an aspect of the present disclosure, which may be combined with any other aspect listed herein unless specified otherwise, the apparatus is configured to provide a diluted draw solution to a thermal desalination unit.

In light of the present disclosure, and without limiting the scope of the disclosure in any way, in an aspect of the present disclosure, which may be combined with any other aspect listed herein unless specified otherwise, a system for desalinating seawater is provided. The system for desalinating seawater includes a thermal desalination device and an apparatus that is operatively coupled to the thermal desalination device. The apparatus further includes a first chamber that is in fluid communication with a feed solution, a second chamber that is in fluid communication with a draw solution, and a membrane that separates the first chamber from the second chamber. The membrane has an active layer and a support layer provided on the active layer, and the membrane includes a nanofiltration membrane.

In an aspect of the present disclosure, which may be combined with any other aspect listed herein unless specified otherwise, the thermal desalination device is configured to perform multi-stage flash distillation.

In light of the present disclosure, and without limiting the scope of the disclosure in any way, in an aspect of the present disclosure, which may be combined with any other aspect listed herein unless specified otherwise, a method of seawater softening is provided. The method comprising the steps of: providing an apparatus comprising a first chamber, a second chamber and a membrane that separates the first chamber from the second chamber, supplying a feed solution to the first chamber, applying a hydraulic pressure on the feed solution, supplying a draw solution to the second chamber. The membrane has an active layer and a support layer provided on the active layer, and the membrane includes a nanofiltration membrane.

The reader will appreciate the foregoing details, as well as others, upon considering the following detailed description of certain non-limiting embodiments including a method, apparatus and system for seawater treatment according to the present disclosure.

BRIEF DESCRIPTION OF THE DRAWINGS

Features and advantages of the method, apparatus and system for seawater treatment described herein may be better understood by reference to the accompanying drawings in which.

Figure 1:
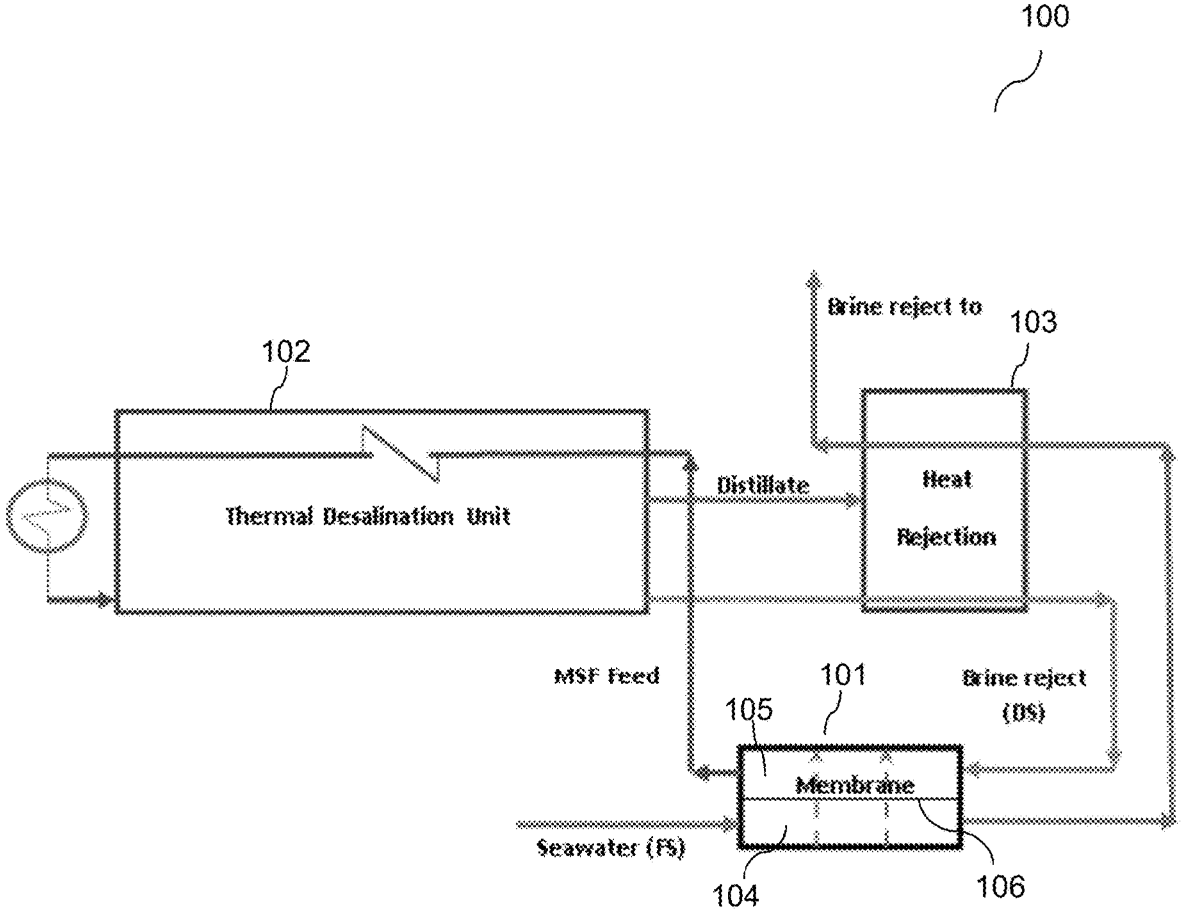
FIG. 1 is a schematic illustration of a system for seawater treatment according to an embodiment of the present disclosure.

The reader will appreciate the foregoing details, as well as others, upon considering the following detailed description of certain non-limiting embodiments of the present disclosure.

DETAILED DESCRIPTION

The present disclosure generally relates to method, apparatus and system for seawater treatment.

The embodiments are described more fully herein after with reference to the accompanying drawings, in which some, but not all embodiments of the present technology are shown. Indeed, the present technology may be embodied in many different forms and should not be construed as limited to the embodiments set forth herein.

Likewise, many modifications and other embodiments of the method, apparatus and system for seawater treatment described herein will come to mind to one of skill in the art to which the invention pertains having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

Throughout the specification and claims, terms may have nuanced meanings suggested or implied in context beyond an explicitly stated meaning. Likewise, the phrase "in an embodiment" as used herein does not necessarily refer to the same embodiment or implementation and the phrase "in another embodiment" as used herein does not necessarily refer to a different embodiment or implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context. In addition, the terms "about," "around" "approximately" and "substantially" are understood to refer to numbers in a range of numerals, for example the range of −10% to +10% of the referenced number, preferably −5% to +5% of the referenced number, more preferably-1% to +1% of the referenced number, most preferably −0.1% to +0.1% of the referenced number.

The terminology used herein is for the purpose of describing particular exemplary embodiments only and is not intended to be limiting. The terms "comprise", "comprises", "comprised" or "comprising", "including" or "having" and the like in the present specification and claims are used in an inclusive sense, that is to specify the presence of the stated features but not preclude the presence of additional or further features.

When an element, component or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Scale formation in the thermal desalination processes is a major drawback that affects the performance of such plants. There are two types of scales in thermal desalination; alkaline and non-alkaline. The latter is often formed in thermal plants operating at high temperatures such as Multi-Stage Flash Distillation ("MSF") which is Qatar's and/or GCC countries' main desalination technology. The non-alkaline scale is caused due to the precipitation of calcium ($Ca^{2+}$) or magnesium ($Mg^{2+}$) ions with sulfate ($SO_4^{2-}$) as calcium sulfate ($CaSO_4$) or magnesium sulfate ($MgSO_4$) salts. Unfortunately, the non-alkaline scale is not responsive to acid cleaning and requires more complicated and labor intensive mechanical cleaning processes. The scale problem may increase the energy requirements and the maintenance cost of the thermal desalination process.

The forward osmosis ("FO") process has been tested as a pretreatment process for removing divalent ions from seawater using brine reject as a draw solution. The experimental work showed the feasibility of seawater softening by FO membranes. Cellulose triacetate ("CTA") and thin-film composite ("TFC") FO membranes were used to treat seawater, showing the potential of osmotically driven membrane technology in water purification applications. The main concerns or drawbacks with the forward osmosis process using FO membranes for seawater softening are limited water flux and high membrane cost. Water flux in the FO process could be increased by applying a small hydraulic pressure on the feed solution side, which is called pressure-assisted forward osmosis ("PAFO") process. During the pressure-assisted forward osmosis process, a pressure pump is provided and coupled to a forward osmosis water treatment apparatus and is configured to apply a hydraulic pressure on the feed solution side to increase water flux in the forward osmosis process. However, the experimental results show that the water flux was still low even if using pressure-assisted forward osmosis process. For example, the water flux is merely around 8 $L/m^2h$ at 4 bar with the active layer of the CTA FO membrane facing the feed solution (AL-FS) mode. Moreover, the cost of CTA and/or TFC FO membranes is 10 times higher than other types of membranes such as nanofiltration membranes or reverse osmosis membranes.

As described above, Multi-Stage Flash Distillation ("MSF") is the main thermal desalination technology in Qatar and many countries in the Gulf Cooperation Council ("GCC") region. MSF technology suffers from non-alkaline scale formation inside the heat exchangers, causing energy and corrosion problems. Magnesium sulfate and calcium sulfate are the main metal salt precipitates in the MSF process. Scale inhibitors may reduce scale problems but cannot prevent it in the long term. Operating MSF at higher TBT is desirable to increase the recovery rate of the desalination plant and the gained output ratio ("GOR"). However, most scale inhibitors are only effective at a top brine temperature ("TBT") less than 112° C., but they are not effective at higher top brine temperature.

According to an embodiment of the present disclosure, a system for desalinating seawater is developed. As illustrated in FIG. 1, the system 100 includes an apparatus 101 for seawater treatment, a thermal desalination unit 102 for desalinating the received feed solution from the apparatus 101, a heat rejection unit 103 for regenerating the draw solution (e.g., brine reject) that was supplied to the apparatus 101 and producing distilled water from the thermal desalination unit 102.

The apparatus 101 according to an embodiment of the present disclosure a first chamber 104 and a second chamber 105 and a membrane 106 that separates the first chamber 104 and the second chamber 105. The first chamber 104 and the second chamber 105 may be integrally made to form a single reservoir or may be individually or separately made and coupled to each other. The membrane 106 separate the first chamber 104 from the second chamber 105 and is a selectively permeable membrane in an embodiment. The membrane 106 may be mounted in a filtration cell in the apparatus 101. The membrane 106 includes an active layer and a support layer provided on the active layer. The membrane may be a nanofiltration membrane and has a molecular weight cut-off value larger than 300 Dalton. The membrane also has a high permeability and rejection rate of 98.5% or more to non-alkaline scales such as calcium sulfate ($CaSO_4$) and/or magnesium sulfate. The support layer may be a thin support layer with a thickness of 200 μm or less in an embodiment. The first chamber 104 may be supplied with a feed solution (e.g., seawater) and the second chamber 105 may be supplied with a draw solution (e.g., brine reject) in an embodiment. The first chamber 104 may be supplied with a draw solution and the second chamber 105 may be supplied with a feed solution in another embodiment. The draw solution has a higher concentration of salts than the feed solution and is used to extract freshwater from the feed solution.

According to an embodiment of the apparatus for seawater treatment, the apparatus further includes a pressure pump. The pressure pump is configured to provide hydraulic pressure to increase water flux during the forward osmosis process. The pressure-assisted forward osmosis process ("PAFO") is preferred because certain nanofiltration membranes cannot be directly used in the forward osmosis process. During the pressure-assisted forward osmosis process, the pressure pump applies a hydraulic pressure (e.g., a small hydraulic pressure) to the feed solution side in order to increase water flux and efficiency of the forward osmosis process. As discussed herein, the nanofiltration membranes include an active layer and a support layer provided on the active layer. The active layer of the nanofiltration membrane is arranged to face the feed solution in the first chamber 104 and the support layer of the nanofiltration membrane is arranged to face the draw solution. Such arrangement of the active layer facing the feed solution is also called AL-FS mode. In the AL-FS mode, such operating arrangement allows, for example, to apply a hydraulic pressure without delaminating the membrane active layer and to maintain the integrity and lifetime of the nanofiltration membrane.

The thermal desalination device 102 as illustrated in FIG. 1 is coupled to the apparatus 101 at an input end and is coupled to a heat rejection device 103 at an output end. The thermal desalination device is configured to receive diluted draw solution (e.g., diluted brine reject) from the apparatus 101. Once the diluted draw solution is supplied to the thermal desalination device 102, the thermal desalination device starts the desalination process. The thermal desalination device 102 may include a Multi-Stage Flash Distillation apparatus according to an embodiment. For example, the thermal desalination device 102 may essentially include one or more multi-flash evaporators provided with one or more multi-flash chambers to perform thermal desalination process. In another embodiment, the thermal desalination device 102 may include a Multiple Effect Distillation (MED) apparatus. The Multi Effect Desalination (MED) apparatus includes an evaporator where seawater is evaporated in one or more evaporation stages at a low temperature (e.g., <70° C.) in order to produce clean distillate water. The distillate water (e.g., distilled water) and concentrated brine reject produced in the thermal desalination device 102 are then provided to the heat rejection device 103. The heat rejection device 103 may include one or more coolers according to an embodiment. The heat rejection device 103 is used here to produce freshwater product and regenerate brine reject which can be used as draw solution and can be circulated back to the apparatus 101 for seawater treatment.

According to an embodiment of the present disclosure, three nanofiltration membranes, namely TS80, UA60, and XN45 were used in a pressure-assisted forward osmosis process for pretreatment of seawater.

Figure 2A:
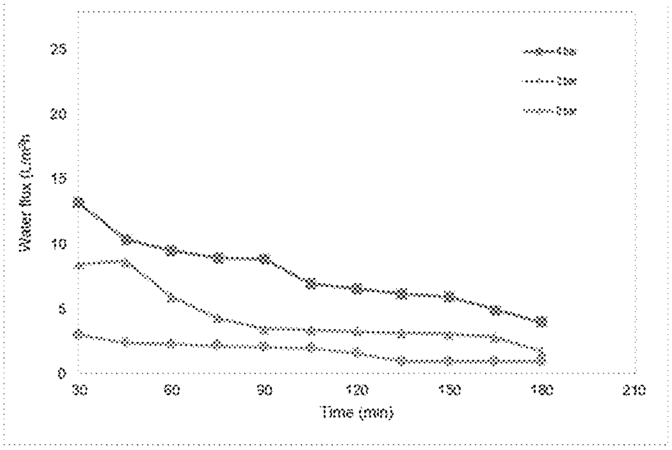
FIG. 2A is a diagram of water flux when UA60 nanofiltration membrane is used according to an embodiment of the present disclosure.
Figure 2B:
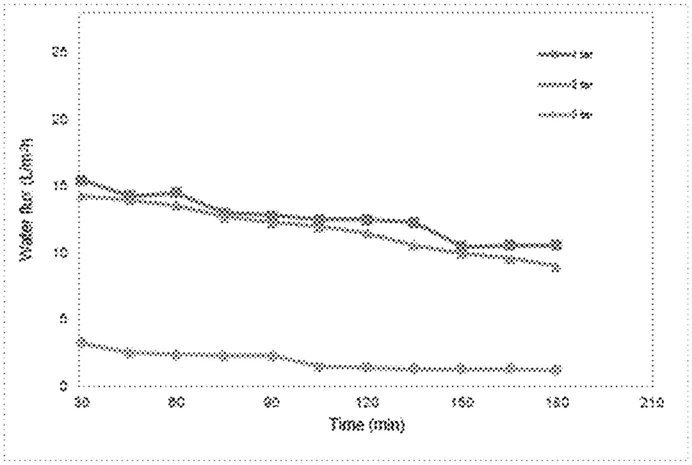
FIG. 2B is a diagram of water flux when XN45 nanofiltration membrane is used according to an embodiment of the present disclosure.
Figure 2C:
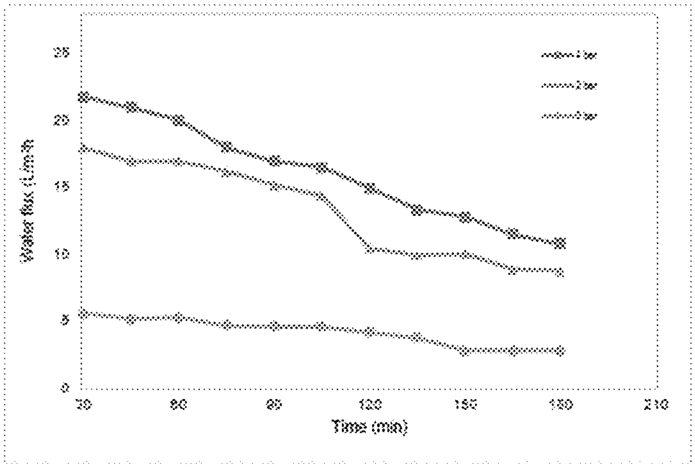
FIG. 2C is a diagram of water flux when TS80 nanofiltration membrane is used according to an embodiment of the present disclosure.

As a non-limiting example, seawater with 45 g/L total dissolved solids concentration at 25° C. was used as the feed solution and brine reject with 80 g/L total dissolved solids concentration at 40° C. was used as the draw solution. The UA60 nanofiltration membrane is between a tight ultrafiltration (UF) membrane and a loose nanofiltration (NF) membrane with 80% normalized rejection rate to calcium, magnesium and sulfate ions. As illustrated in FIG. 2A, the UA60 nanofiltration membrane shows low water flux, 14 $L/m^2h$, at 4 bar due to the loss of draw solution. The XN45 nanofiltration membrane has 96% normalized rejection rate to calcium, magnesium and sulfate ions. As illustrated in FIG. 2B, the water flux in the XN45 nanofiltration membrane at 4 bar is 18 $L/m^2h$, which is about 1.5 times higher than the cellulose triacetate (CTA) forward osmosis membranes such as CTA FTS FO membranes and slightly higher than the water flux in the thin-film composite (TFC) forward osmosis membranes such as TFC Porifera FO membranes. On the other hand, the TS80 nanofiltration membrane has 99% rejection rate to calcium, magnesium and sulfate ions. As illustrated in FIG. 2C, the water flux in TS80 nanofiltration membrane at 4 bar is 23 $L/m^2h$, which is twice the water flux of the CTA FTS FO membrane and 1.4 times of the TFC Porifera FO membranes. The TS80 nanofiltration membrane has water permeability 7.4 $L/m^2h$ bar (about 7 times higher than CTA FO membrane), 130-170 μm thickness, and 80% rejection to sodium chloride NaCl. The water permeability of certain commercial FO membrane manufactured at Fluid Technology Solution H2O (FTS) is 0.627 $L/m^2h$. Porifera FO membranes have an improved water permeability coefficient of 1.23 $L/m^2h$, but the water permeability coefficient is still 4 times less than TS80 NF membrane. The TS80 nanofiltration membrane is mounted in the FO filtration cell, and at 0 bar pressure across the TS80 nanofiltration membrane, water flux was only 6 $L/m^2h$ compared to 8 $L/m^2h$ for the CTA FO membrane. This is due to the structure of the TS80 nanofiltration membrane that restricts water transports in the forward osmosis mode. However, the water flux in TS80 NF membrane jumped to 23 $L/m^2h$ at 4 bar pressure on the feed solution, also known pressure-assisted forward osmosis process (PAFO). In comparison, at 4 bar pressure on the feed side, water flux in the CTA and TFC FO membrane was 10.8 $L/m^2h$ and 14.7 $L/m^2h$, respectively. The TS80 nanofiltration membrane is competitive to CTA and TFC FO membranes when it operates in the pressure-assisted forward osmosis process with the feed solution facing the active layer of the nanofiltration membrane (AL-FS mode).

Based on the experiment results as discussed herein, the XN45 and the TS80 nanofiltration membranes are competitively applicable in the forward osmosis process to the extent that that they operate in pressure-assisted forward osmosis process and in AL-FS mode. The pressure-assisted forward osmosis process is more efficient in the dilution of the brine reject draw solution and does not result in a significant increase in the power consumption.

Figure 3A:
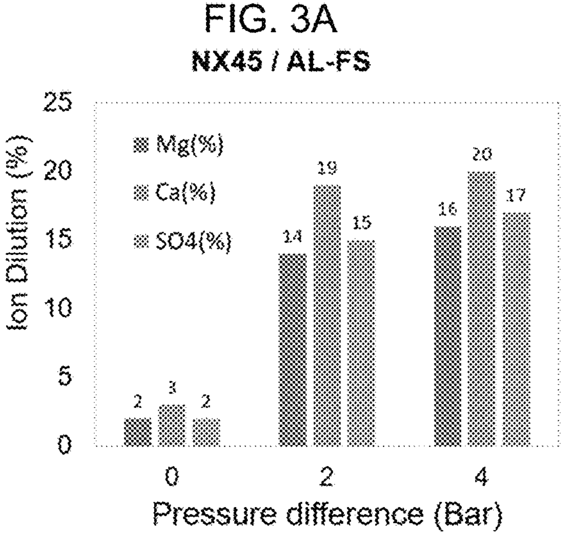
FIG. 3A is a diagram of ions dilution when XN45 nanofiltration membrane is used according to an embodiment of the present disclosure.
Figure 3B:
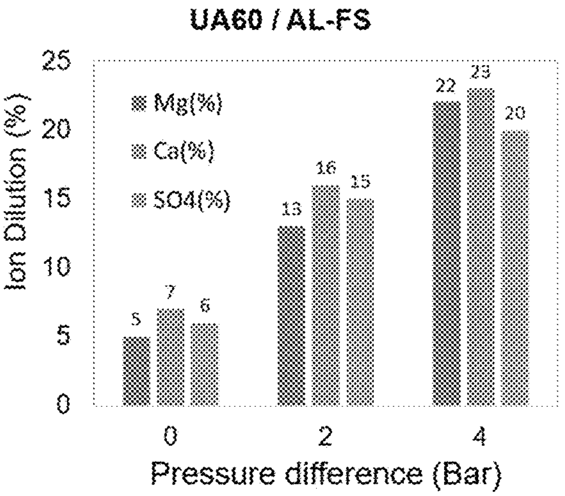
FIG. 3B is a diagram of ions dilution when UA60 nanofiltration membrane is used according to an embodiment of the present disclosure.
Figure 3C:
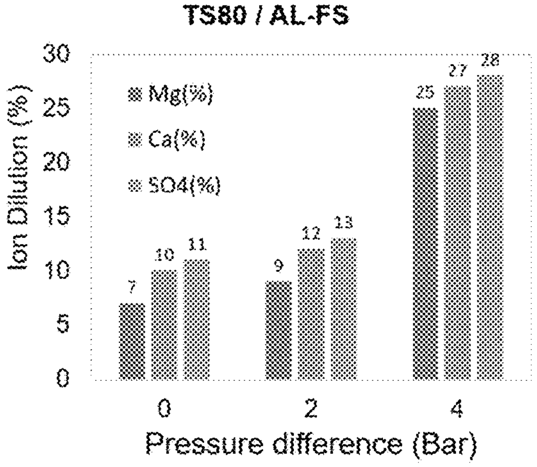
FIG. 3C is a diagram of ions dilution when TS80 nanofiltration membrane is used according to an embodiment of the present disclosure.
Figure 3D:
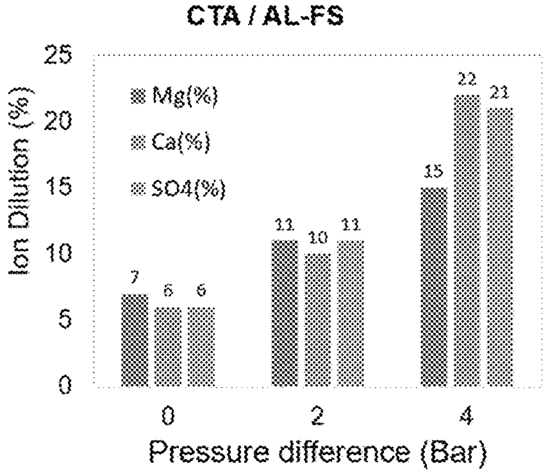
FIG. 3D is a diagram of ions dilution when a cellulose triacetate (CTA) forward osmosis membrane as a comparative example is used.
Figure 3E:
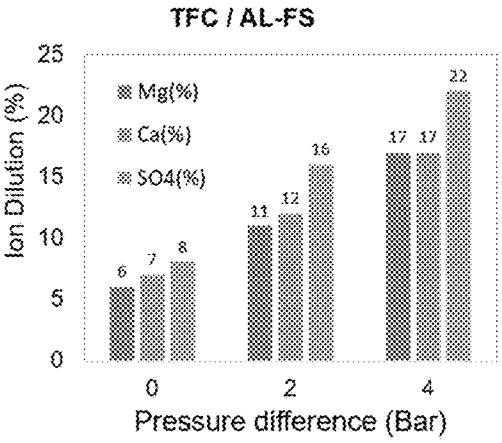
FIG. 3E is a diagram of ions dilution when a thin-film composite (TFC) forward osmosis membrane as a comparative example is used.

The UA60, XN45, and TS80 nanofiltration membranes were further tested for calcium, magnesium, and sulfate ions rejection. The diluted brine reject from the forward osmosis process was analyzed for calcium, magnesium and sulfate ions at the end of the filtration process. The experimental results are illustrated in FIGS. 3A to 3E. As illustrated in FIG. 3A, the test result shows that the reduction or dilution of divalent ions such as Ca, Mg, and $SO_4$ ions at 4 bar test using XN45 nanofiltration membrane is 16%, 20%, 17% for Mg, Ca and $SO_4$ ions, respectively. As illustrated in FIG. 3B, the test result shows that the reduction or dilution of divalent ions at 4 bar using the UA60 nanofiltration membrane are 22%, 23%, and 20% for Mg, Ca and $SO_4$ ions, respectively. As illustrated in FIG. 3C, the test result shows that the reduction or dilution of divalent ions at 4 bar using the TS80 nanofiltration membrane are 25%, 27%, and 28% for Mg, Ca and $SO_4$ ions, respectively. Based on the test results as discussed herein, the TS80 nanofiltration membrane has the best ion reduction percentages for Mg, Ca and $SO_4$ ions. A commercial cellulose triacetate (CTA) forward osmosis membrane (FTS CTA FO membrane) and a commercial thin-film composite (TFC) forward osmosis membrane (TFC Porifera FO membrane) are also tested as comparative examples. As illustrated in FIG. 3D, the test result shows that the reduction or dilution of divalent ions at 4 bar using the CTA FO membrane are 15%, 22%, and 21% for Mg, Ca and $SO_4$ ions, respectively. As further illustrated in FIG. 3E, the test result shows that the reduction or dilution of divalent ions at 4 bar using the TFC FO membrane are 17%, 17%, and 22% for Mg, Ca and $SO_4$ ions, respectively. Compared to the current FO membranes such as CTA FO membrane and TFC FO membrane, the TS80 nanofiltration membrane achieved a higher reduction of Ca, Mg and $SO_4$ ions in the brine when it operates at 4 bar. Given that the target reduction percentage of divalent ions is 14% for the Multi-Stage Flash Distillation plant to operate at a performance ratio of 8, the experimental results show that the TS80 nanofiltration membrane shows significant improvement to remove the scale issues in the thermal desalination process.

There is also a cost-benefit in using the TS80 nanofiltration membrane compared to certain commercial FO membranes as discussed above. For example, a 10,000 $m^3/d$ FO plant using a TFS CTA FO membrane will cost US$5,426,136 compared to US$274,582 when using a TS80 nanofiltration membrane (Table 1). Based on the analysis numbers in Table 1, the cost of the CTA FO membrane is about 20 times more than the TS80 nanofiltration membrane for a 10,000 $m^3/d$ FO plant. Thus, the TS80 nanofiltration membrane is more competitive to the pressure-assisted forward osmosis process with the feed solution facing the active layer of the nanofiltration membrane (AL-FS mode).

TABLE 1

Cost of CTA FO and TS80 nanofiltration membrane required for 10,000 $m^3/d$ plant. The cost of CTS FO membrane is US$1,719 and the cost of the TS80 NF membrane is US$600. The membrane area is 16.5 $m^2$ and 40 $m^2$ for the CTA FO and the TS80 nanofiltration membranes, respectively.

| Membrane | Membrane Area ($m^2$) | No. Element | Cost U.S. $ |
|---|---|---|---|
| TS80 4 bar | 18305 | 458 | $274,582 |
| CTA | 52083 | 3157 | $5,426,126 |

According to another embodiment of the present disclosure, a method of seawater treatment is provided. As a non-limiting example, the method can be used to soften seawater and pretreat the seawater for a subsequent thermal desalination process. As illustrated in FIG. 1, the method, for example, includes the steps of providing an apparatus comprising a first chamber, a second chamber and a membrane that separates the first chamber from the second chamber, supplying a feed solution to the first chamber, applying a hydraulic pressure on the feed solution, supplying a draw solution to the second chamber, and causing the water of the feed solution to pass through an active layer (AL) of the membrane from the first chamber to the second chamber due to the osmotic pressure gradient across the membrane. The membrane may have an active layer and a support layer provided on the active layer. The membrane may be a nanofiltration membrane and has a molecular weight cut-off value larger than 300 Dalton in an embodiment. The membrane may also have a high permeability and rejection rate of 98.5% or more to non-alkaline scales such as calcium sulfate ($CaSO_4$) and/or magnesium sulfate ($MgSO_4$). The support layer may be a thin support layer with a thickness of 200 μm or less in an embodiment. The first chamber may be supplied with a feed solution (e.g., seawater) and the second chamber may be supplied with a draw solution (e.g., brine reject) in an embodiment. The draw solution has a higher concentration of salts than the feed solution and is used to extract freshwater from the feed solution. The diluted draw solution may serve as a quality feed solution and be further supplied to a thermal desalination unit subject to subsequent thermal desalination processes in an embodiment.

The method may be used for pretreatment of seawater to remove divalent ions, sulfate and/or other precipitation forming elements from seawater for the Multi-Stage Flash Distillation desalination process in an embodiment. In another embodiment, the method may be used for pretreatment of seawater for Multi-Effect Distillation (MED) desalination process. The MED desalination process operates at 67° C. TBT, and the main scale problem is the precipitation of magnesium and calcium hydroxide ions on the heat exchangers. One purpose of using forward osmosis pretreatment is the removal of precipitation forming elements such as magnesium and calcium ions from the seawater while diluting the reject brine to the MED plant. One of the advantages of the method of seawater softening described herein is that by utilization of a high permeability nanofiltration membrane in the forward osmosis, it will provide a high quality feed solution to the thermal desalination process, minimize the scale problem and reduce the energy consumption and the maintenance cost of the thermal desalination process.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications can be covered by the appended claims.

The invention is claimed as follows:

1. An apparatus, comprising:

a first chamber that is in fluid communication with a feed solution, a second chamber that is in fluid communication with a draw solution, a membrane that separates the first chamber from the second chamber, wherein the membrane has an active layer and a support layer provided on the active layer, wherein the membrane includes a nanofiltration membrane, wherein the apparatus couples to thermal desalination device at an input end and a heat rejection device at an output end, wherein the thermal desalination device produces clean distillate water, wherein the heat rejection device receives clean distillate water from thermal desalination device, wherein the heat rejection device receives draw solution, wherein the heat rejection device produces freshwater product, wherein the heat rejection device produces regenerate brine reject, and wherein the regenerate brine reject is circulated to the apparatus.

2. The apparatus of claim 1, wherein the membrane has a molecular weight cut-off value larger than 300 Dalton.

3. The apparatus of claim 1, wherein the membrane has a rejection rate to magnesium sulfate of 98.5% or more.

4. The apparatus of claim 1, wherein the support layer has a thickness of 200 μm or less.

5. The apparatus of claim 1, wherein the active layer of the membrane faces the feed solution and the support layer of the membrane faces the draw solution.

6. The apparatus of claim 1, wherein the feed solution includes seawater.

7. The apparatus of claim 1, wherein the draw solution includes brine reject.

8. The apparatus of claim 7, wherein the draw solution has higher concentration of salt than the feed solution.

9. The apparatus of claim 1 further comprising a pressure pump, wherein the pressure pump is configured to apply a hydraulic pressure on feed solution.

10. The apparatus of claim 1, wherein the apparatus is configured to provide a diluted draw solution to a thermal desalination unit.

11. A system for desalinating seawater, comprising:

a thermal desalination device, a heat rejection device, an apparatus that is operatively coupled to the thermal desalination device and to the heat rejection device, the apparatus comprising:

a first chamber that is in fluid communication with a feed solution, a second chamber that is in fluid communication with a draw solution, a membrane that separates the first chamber from the second chamber, wherein the membrane has an active layer and a support layer provided on the active layer, wherein the membrane includes a nanofiltration membrane;

wherein the thermal desalination device produces clean distillate water, wherein the heat rejection device receives clean distillate water from thermal desalination device, wherein the heat rejection device receives draw solution, wherein the heat rejection device produces freshwater product, wherein the heat rejection device produces regenerate brine reject, and wherein the regenerate brine reject is circulated to the apparatus.

12. The system of claim 11, wherein the thermal desalination device is configured to perform multi-stage flash distillation.

13. The system of claim 11, wherein the membrane has a molecular weight cut-off value larger than 300 Dalton.

14. The system of claim 11, wherein the membrane has a rejection rate to magnesium sulfate of 98.5% or more.

15. The system of claim 11, wherein the support layer has a thickness of 200 μm or less.

16. The system of claim 11, wherein the active layer of the membrane faces the feed solution and the support layer of the membrane faces the draw solution.

17. The system of claim 11, wherein the feed solution includes seawater and the draw solution includes brine reject.

18. The system of claim 17, wherein the draw solution has higher concentration of salt than the feed solution.

19. The system of claim 11 further comprising a pressure pump, wherein the pressure pump is configured to apply a hydraulic pressure on feed solution.

20. A method of seawater softening, the method comprising:

providing an apparatus comprising a first chamber, a second chamber, and a membrane that separates the first chamber from the second chamber, supplying a feed solution to the first chamber, applying a hydraulic pressure on the feed solution, supplying a draw solution to the second chamber, wherein the membrane has an active layer and a support layer provided on the active layer, wherein the membrane includes a nanofiltration membrane, wherein the apparatus couples to thermal desalination device at an input end and a heat rejection device at an output end, wherein the thermal desalination device produces clean distillate water, wherein the heat rejection device receives clean distillate water from thermal desalination device, wherein the heat rejection device receives draw solution, wherein the heat rejection device produces freshwater product, wherein the heat rejection device produces regenerate brine reject, and wherein the regenerate brine reject is circulated to the apparatus.

* * * * *